(12) United States Patent
Main

(10) Patent No.: US 7,546,249 B2
(45) Date of Patent: Jun. 9, 2009

(54) SYSTEM AND METHOD FOR MANAGING ADVERTISING INVENTORY TO MAXIMIZE ADVERTISING REVENUE

(75) Inventor: Robert Main, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1829 days.

(21) Appl. No.: 09/778,666

(22) Filed: Feb. 6, 2001

(65) Prior Publication Data

US 2002/0133399 A1 Sep. 19, 2002

(51) Int. Cl.
G06Q 30/00 (2006.01)
(52) U.S. Cl. .................................................. 705/14
(58) Field of Classification Search .................... 705/14
See application file for complete search history.

(56) References Cited

U.S. PATENT DOCUMENTS

| | | | |
|---|---|---|---|
| 5,918,209 | A | 6/1999 | Campbell et al. |
| 6,017,771 | A | 1/2000 | Yang et al. |
| 6,049,774 | A | 4/2000 | Roy |
| 6,061,691 | A | 5/2000 | Fox |
| 6,064,967 | A | 5/2000 | Speicher |
| 6,134,532 | A | 10/2000 | Lazarus et al. |
| 6,338,043 | B1 * | 1/2002 | Miller .......................... 705/14 |
| 2001/0027412 | A1 | 10/2001 | Son |
| 2001/0039510 | A1 | 11/2001 | Galomb |
| 2002/0019768 | A1 | 2/2002 | Fredrickson et al. |
| 2002/0077891 | A1 | 6/2002 | Castle et al. |
| 2002/0082941 | A1 | 6/2002 | Bird |

OTHER PUBLICATIONS

Desiraju, Romarao, et al., "Strategic service pricing and yield management", J. of Marketing, v. 63 (Jan. 1999), 44-56.*
Robert B. Wilson, *Nonlinear Pricing*, 1993 Oxford University Press.
Sylvain Daudel and Georges Vialle, *Yield Management—Applications To Air Transport and Other Service Industries*, 1994 Institut du Transport Aerien—Paris.
Joe Wolosz, *Hotel & Motel Sales, Marketing & Promotion—Strategies To Impact Revenue and Increase Occupancy*, 1997 Infinite Corridor Publishing.
Jeffrey L. Magee, *Yield Management—The Leadership Alternative for Performance and Net Profit Improvement*, 1998 CRC Press LLC.
Tae Hoon Oum and Chunyan Yu, *Winning Airlines—Productivity and Cost Competitiveness of the World's Major Airlines*, 1998 Kluwer Academic Publishers.

* cited by examiner

Primary Examiner—Donald L Champagne
(74) Attorney, Agent, or Firm—Brinks Hofer Gilson & Lione

(57) ABSTRACT

The present invention relates to managing advertising inventory. More specifically, the present invention relates to a system and method for managing advertising inventory so as to enhance total ad revenue. In a preferred embodiment, one or more restrictions are selectively applied to limit the respective availability levels of one or more selected categories of advertisements within the advertising inventory. Typically, the selected categories of advertisements which are subject to the restrictions are at the lowest end of the pricing levels. By limiting the respective availability levels of selected categories of advertisements, unnecessary displacements of other categories of advertisements which are priced at the higher end of the pricing levels are reduced, thereby enhancing the total ad revenue that can be generated.

18 Claims, 7 Drawing Sheets

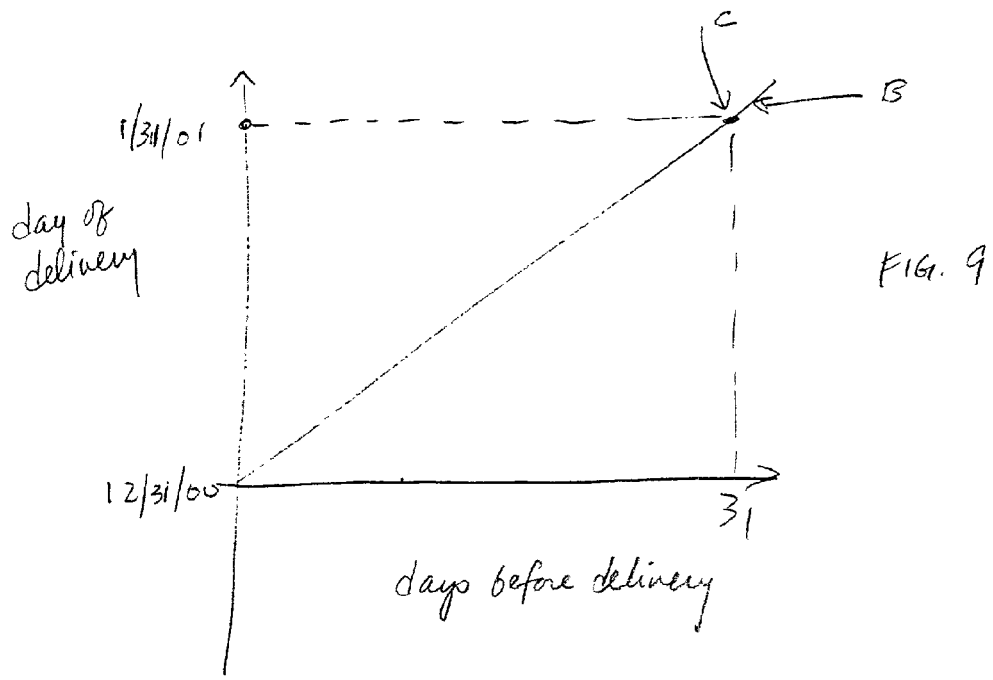
FIG. 9
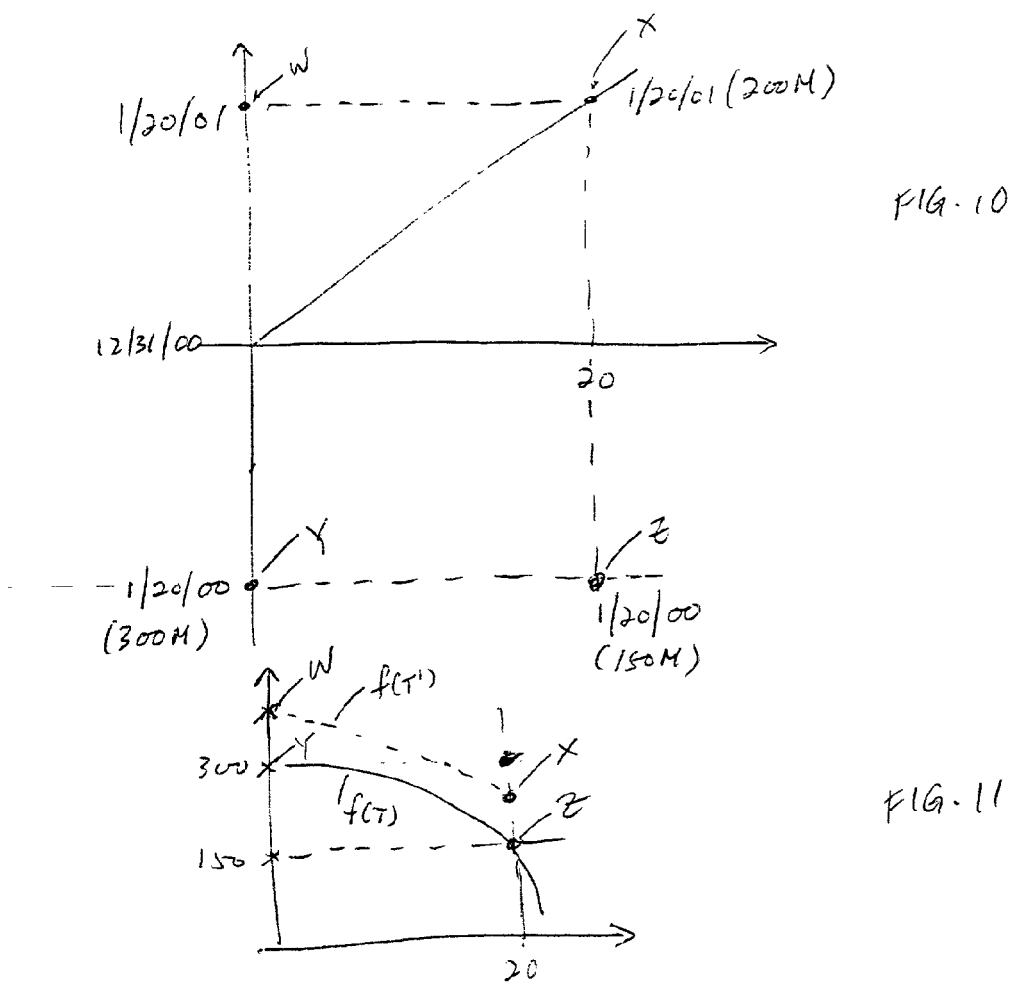
FIG. 10
FIG. 11

SYSTEM AND METHOD FOR MANAGING ADVERTISING INVENTORY TO MAXIMIZE ADVERTISING REVENUE

BACKGROUND OF THE INVENTION

Use of the Internet by the general public is certainly gaining popularity. More and more people are getting access to the Internet and the vast amount of information that it provides. Along with the rapid increase in the number of Internet users, advertising on the Internet has consequently become an important priority for many advertisers.

As a result, for web portals and ISPs, a significant amount of revenue can be generated from displaying advertisers' ad banners on displayed websites or web pages. For example, for a preeminent portal such as Yahoo! which is visited daily by millions of users, considerable revenue can be made by displaying an advertiser's ad impressions on its websites or web pages.

As with any other revenue-generating endeavor, the goal of selling ad impressions on websites or web pages is to maximize the total ad revenue as much as possible. Hence, it would be desirable to provide a system and method that is capable of optimizing the chargeable ad rates so as to generate the maximum amount of ad revenue amongst existing advertising inventory.

Generally, the advertisers pay a fee for each ad viewed by web users. Contracts to show ad impressions are normally signed several weeks/months before ad impressions get delivered. The duration of contracts ranges from one day to multiple years. Typically, there are several types of contracts, including regular contracts, exclusive contracts and infinite contracts. For regular contracts, the advertisers purchase a designated number of ad views on a chosen space (web page). For exclusive contracts, they purchase all the ad views on a chosen space. For infinite contracts, they purchase all the leftover ad views on a chosen space after other regular contracts related to that space have been fulfilled.

These several types of contracts are generally priced at different rates. Even within the same type of contract, rates usually vary depending on a number of factors including, for example, ad showing times, location of ad impressions, advertisers' demand, etc. This type of rate or pricing structure, i.e., having different rates for the same commodity, is commonly known as differential pricing. Typically, these ad rates are predetermined based on market research and they generally do not vary within a particular sale period until the updated ad rates are published.

Furthermore, while ad rates are regularly provided to the salespersons, the quantity of ads that ideally should be sold under each rate is not usually provided, leaving the quantity of ads sold mostly up to the discretion of the salespersons. The lack of management relating to the quantity of ads to be sold under different rates contributes to under-optimization of total ad revenue. This is because it is difficult for a salesperson to predict how much more of the higher priced ads he can sell before the last possible sale date. If he reserves a large block of ads for a higher rate and that block is not sold out, then revenue is lost on those unsold ads which might otherwise have been sold at a lower rate. In the other case, if he allocates only a small block of ads for the higher rate and demand for such ads exceeds the small allocation, then revenue is similarly lost on those unmet demand since such demand might have been satisfied if he had allocated a larger block. Hence, it is important to monitor and manage the advertising inventory appropriately. It would be desirable to provide a method and system that is capable of managing advertising inventory so as to maximize total ad revenue.

Moreover, under customary ad sales practice, ad rates are provided to the salespersons as guidelines only and the salespersons have a large degree of flexibility to use these ad rates as they fit. Without any kind of effective monitoring or management of the existing advertising inventory, the total ad revenue is often not optimized. This under-optimization can be attributed to a number of reasons. For example, in the case where a salesperson has a considerable amount of discretion to charge different ad rates, the salesperson might be more interested in selling out his assigned allotment of ads instead of maximizing the total ad revenue. In other words, instead of trying to sell the ads at a higher rate, a salesperson may be content with simply selling his ads at a much lower rate for reasons such as pleasing particular customers or satisfying his sales quota. Hence, the goal of maximizing sales does not always coincide with the goal of maximizing total revenue. Thus, it would be desirable to provide a system and method that is capable of setting and controlling quantity of ads to be sold so as to maximize total ad revenue.

By way of background, FIG. 1 shows a simplified schematic diagram illustrating a typical system for delivering ads to web pages for viewing by a user. This typical system includes a webserver 10, an ad server 12, and an ad delivery schedule 14. The ad delivery schedule 14 is provided to the ad server 12 on a regular basis. The ad delivery schedule 14 generally includes a variety of information such as ads that are scheduled to be shown, display locations of these ads, duration of display, etc. Upon a user 16 clicking on a hyperlink or otherwise entering the url directly for a desired web page, the webserver 10 checks the ad spaces that need to be filled in for that desired web page and then requests the needed ads from the ad server 12. The ad server 12 subsequently serves the needed ads to the webserver 10 based on the ad delivery schedule 14. Upon receiving the needed ads, the webserver 10 incorporates these ads into the desired web page so as to allow them to be displayed to the user 16.

SUMMARY OF THE INVENTION

The present invention relates to managing advertising inventory. More specifically, the present invention relates to a system and method for managing advertising inventory so as to enhance total ad revenue.

In an exemplary embodiment, one or more restrictions are selectively applied to limit the respective availability levels of one or more selected categories of advertisements within the advertising inventory.

In a preferred embodiment, the one or more restrictions are implemented within an inventory management system. The inventory management system generally provides various functionality to process and/or handle the advertising inventory. An ad request interface is provided to communicate with the inventory management system. During operation, a user, such as a salesperson, enters a request via the ad request interface to inquire about the availability of certain specified category of advertisements from the advertising inventory. For example, the user via the request can inquire about the availability of ads which are scheduled to appear on a specified date and fit certain demographic profile. The inventory management system first analyzes the request and determines the estimated availability of the specified category of advertisements. The inventory management system then selectively applies one or more restrictions, if appropriate, to adjust the estimated availability of the specified category of advertisements. The adjusted availability of the specified category of advertisements is then incorporated into a response to be then delivered back to the user to satisfy his request.

Typically, the selected categories of advertisements which are subject to the restrictions are at the lowest end of the pricing levels. By limiting the respective availability levels of selected categories of advertisements, unnecessary displacements of other categories of advertisements which are priced at the higher end of the pricing levels are reduced, thereby enhancing the total ad revenue that can be generated.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

FIGS. 7-11 are a series of illustrative diagrams illustrating how a demand curve is calculated and extrapolated in accordance with one embodiment of the present invention.

DESCRIPTION OF THE SPECIFIC EMBODIMENTS

Figure 1:
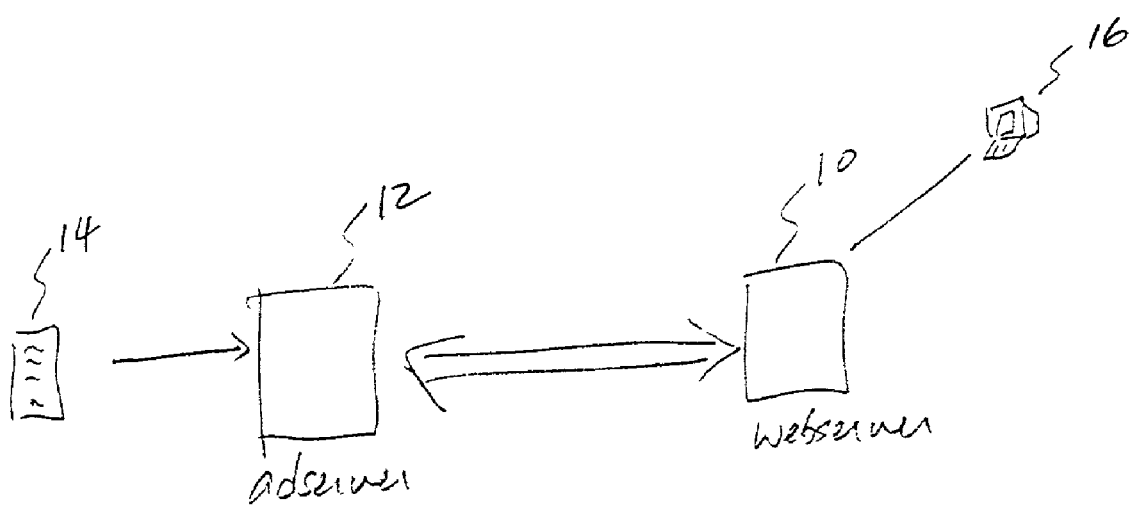
FIG. 1 is a simplified schematic diagram illustrating a typical system for delivering ads to web pages for viewing by a user.
Figure 2:
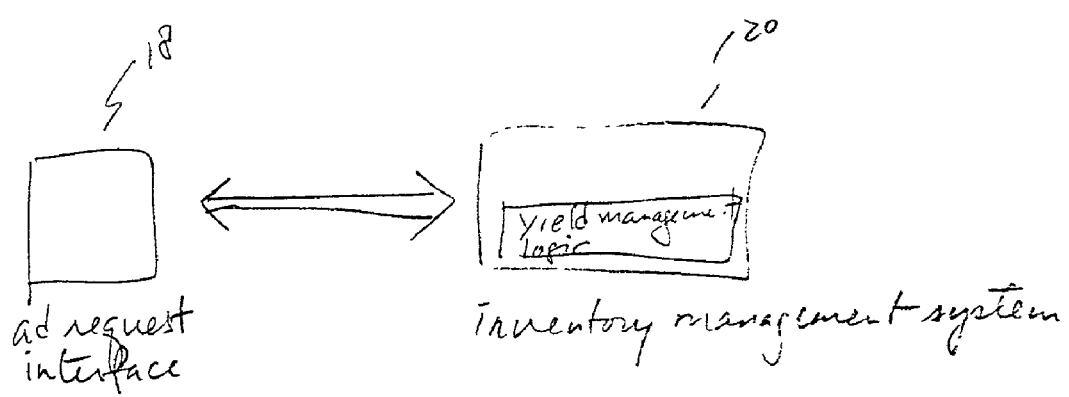
FIG. 2 is a simplified schematic block diagram showing one embodiment in accordance with the present invention.

The present invention will now be described. FIG. 2 is a simplified schematic block diagram showing one embodiment of the present invention. In this embodiment, an ad request interface 18 communicates with an inventory management system 20. For a prominent web portal or web site, such as Yahoo!, a considerable number of web pages reside on its system at any one time. Each web page typically contains a number of ads. Consequently, the number of ads that need to be managed is often astronomical. The inventory management system 20 is designed to manage the advertising inventory. The inventory management system 20 performs a myriad of functions. For example, one function performed by the inventory management system 20 is to generate the appropriate ad delivery schedules 14 to the ad server 12, and another function is to provide information on advertising inventory in response to a user request received via the ad request interface 18.

More specifically, a salesperson who is interested in ascertaining the availability of ads fitting certain specified parameters can inquire about such availability using the ad request interface 18. By using the ad request interface 18, the salesperson can issue an ad request to the inventory management system 20. Such request includes information such as date and time of desired showing, specified demographic characteristics, price range, etc. For example, the ad request may inquire about the availability of ads on Dec. 25, 2000 which target a male audience who is interested in sports. In response, the inventory management system 20 provides the total number of available ads or ad impressions which satisfy the specific ad request.

The inventory management system 20 derives the total number of available ads or ad impressions as follows. First, the total advertising inventory satisfying the particular ad request is determined. Having determined the relevant total advertising inventory, the total inventory which satisfies the ad request but has been sold is then calculated. As part of this calculation, data from the pertinent ad contracts are examined to arrive at the relevant total sold inventory. The relevant total sold inventory is then subtracted from the relevant total inventory to derive the relevant total available inventory. The relevant total available inventory is then further manipulated before it is provided to the salesperson so as to maximize total ad revenue.

In an exemplary embodiment, the inventory management system 20 selectively establishes booking limit(s) on the availability of certain selected types of inventory. In other words, a predetermined quantity of available ad impressions is allocated for one or more types of inventory. The selective booking limit(s) can be determined in a variety of ways. For example, in a preferred embodiment, these selective booking limit(s) are determined based on risk/demand analyses for specific ad impressions using market and/or industry research. Risk/demand analyses for advertisements are commonly known in the advertising industry. The primary objective of the selective booking limit(s) is to reasonably ascertain how much of the lower priced inventory should be sold, or, conversely, how much of the higher priced inventory can be sold. The result of the selective booking limit(s) is conveyed to the salesperson based on either volume or price.

Figure 3:
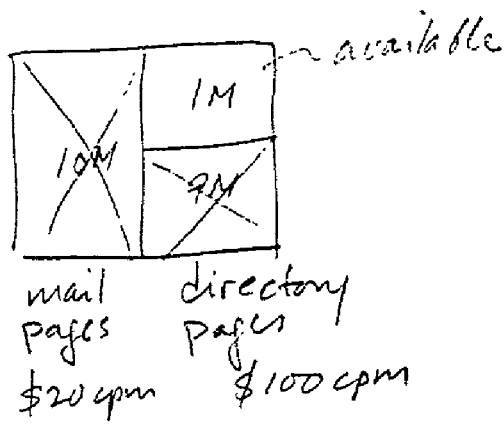
FIGS. 3 and 4 are illustrative diagrams illustrating the operation of an embodiment of the present invention.

The selective booking limit(s) process is illustrated in the following examples. FIG. 3 is an illustrative diagram showing the amount of inventory for both sold and available ad impressions for a one-day period without applying any selective booking limit(s) to any inventory. The ad request indicates that availability information on one million ad impressions at a rate of $9 cpm (cost per thousand) is needed. The total inventory for both the mail pages and the directory pages is shown to be ten million ad impressions respectively. It is also shown that during this one-day period, all the ad impressions (ten million) on the mail pages have already been sold out at a price of $20 cpm and that nine out of ten million ad impressions on the directory pages have also been sold out at a price of $100 cpm, leaving one million ad impressions available on the directory pages. If the one million ad impressions are immediately sold at $9 cpm to satisfy the ad request, then the total ad revenue generated is $1109M or $1.109B (1M×$9+ 10M×$20+9M×$100).

Figure 4:
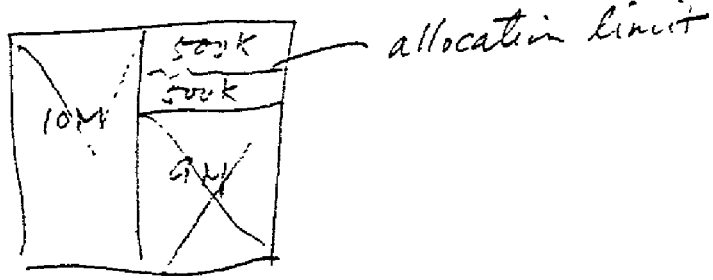

FIG. 4 is an illustrative diagram showing the amount of inventory for both sold and available ad impressions for the same one-day period after applying selective booking limit(s) to the category of ad impressions selling at $9 cpm. Likewise, the ad request indicates that availability information on one million ad impressions at a rate of $9 cpm is needed, and the total inventory for both the mail pages and the directory pages is shown to be ten million ad impressions respectively. Similarly, it is shown that during this one-day period, all the ad impressions (ten million) on the mail pages have already been sold out at a price of $20 cpm and that nine out of ten million ad impressions on the directory pages have also been sold out at a price of $100 cpm, leaving one million ad impressions available on the directory pages. After applying the selective booking limit(s), it is determined that only 500K of the available one million ad impressions are priced to be sold at $9 cpm and that the remaining 500K are priced to be sold at $100 cpm. Thus, the salesperson issuing the ad request is informed that only 500K ad impressions are available for sale, i.e. only half of his request can be satisfied.

If the selective booking limit(s) is effective, i.e., the risk/demand analysis is accurate, the total ad revenue generated is then increased as follows. By limiting the quantity of lower price ad impressions ($9 cpm) available for sale to 500K, the remaining 500K ad impressions are sold at a higher price ($100 cpm). As a result, additional revenue is generated in the amount of $45.5M ( ($100−$9)×500K). In contrast to the example given in FIG. 3, by not selling all the available ad impressions on a first-come-first-serve basis, the total ad revenue is maximized. It is realized that the effectiveness of any selective booking limit(s) necessarily depends on the underlying risk/demand analysis. Continuing with foregoing example, if the 500K allocation is unreliable and none of the 500K ad impressions could be sold at $100 cpm, then there obviously would be a loss since those 500K ad impressions could have been sold for at least $9 cpm.

Figure 5:
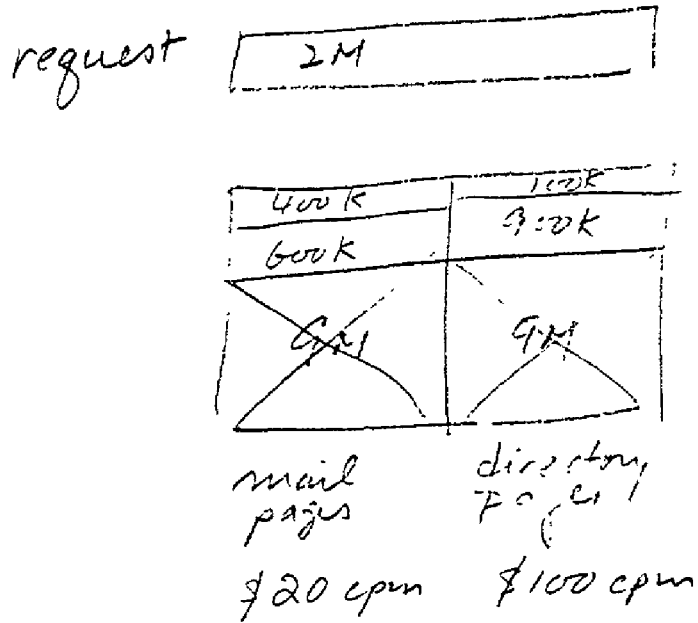
FIG. 5 is an illustrative diagram illustrating the operation of another embodiment of the present invention.

As mentioned above, the result of the selective booking limit(s) can also be expressed based on price. FIG. 5 is an illustrative diagram showing the amount of inventory for both sold and available ad impressions for another one-day period after applying selective booking limit(s) to the category of ad impressions selling at $9 cpm. The ad request indicates that availability information on two million ad impressions at a rate of $9 cpm is needed, and the total inventory for both the mail pages and the directory pages is shown to be ten million ad impressions respectively. It is further shown that during this one-day period, all nine out of ten million available ad impressions on the mail pages have already been sold out at a price of $20 cpm and that nine out of ten million available ad impressions on the directory pages have also been sold out at a price of $100 cpm, leaving one million ad impressions available respectively on both the mail pages and the directory pages. After applying the selective booking limit(s), it is determined that 400K of the available one million ad impressions on the mail pages are priced to be sold at $9 cpm and that the remaining 600K ad impressions are priced to be sold at $20 cpm, and that 100K of the available one million ad impressions on the directory pages are priced to be sold at $9 cpm while the remaining 900K ad impressions are priced to be sold at $100 cpm.

Without any selective booking limit(s), the average ad price for the two million ad impressions is $9. Assuming that the selective booking limit(s) is effective, the average ad prices for various levels of sale are shown in FIG. 5. If 500K ad impressions are sold at $9 cpm, then the average ad price is $9 per ad; if 1100K or 1.1M ad impressions are sold (500K at $9 cpm and 600K at $20 cpm), then the average ad price is $15 per ad; and if all 2 million ad impressions are sold (500K at $9 cpm, 600K at $20 cpm, and 900K at $100 cpm), then the average ad price increases to $50 per ad. Again, as the foregoing shows, by maintaining a quantity ceiling on the lower priced ad impressions, more ad revenue can be generated.

As described above, the selective booking limit(s) are applied to avoid the unnecessary displacement of higher priced ad impressions by lower priced ad impressions, thereby reducing the potential loss of revenue. While the selective booking limit(s) as shown above are for an one-day period, it should be understood that different selective booking limit(s) can be applied and/or adjusted at various points in time. For example, if the demand for higher priced ad impressions is lower than anticipated, then the available inventory allocated for the lower priced ad impressions may need to be increased to minimize the number of unsold ad impressions; similarly, if the demand for higher priced ad impressions is better than expected, then the available inventory allocated for the lower priced ad impressions may need to be reduced so as to minimize the displacement of the higher priced ad impressions. In either of the foregoing cases, the total ad revenue is optimized.

Furthermore, while the above examples illustrate the application of selective booking limit(s) on the lowest price ad impressions, it should be understood that the selective booking limit(s) can similarly be applied to two or more different categories of ad impressions. For example, assuming that there are four different categories of ad impressions each having its own pricing level, the lowest priced ad impressions may be allocated one specified level of availability, the next-to-the-lowest priced ad impressions may be allocated another level of availability, and the second-to-the-lowest priced ad impressions may be further allocated a third level of availability. Typically, the higher priced ad impressions are given a higher level of availability in order to maximize ad revenue.

Figure 6:
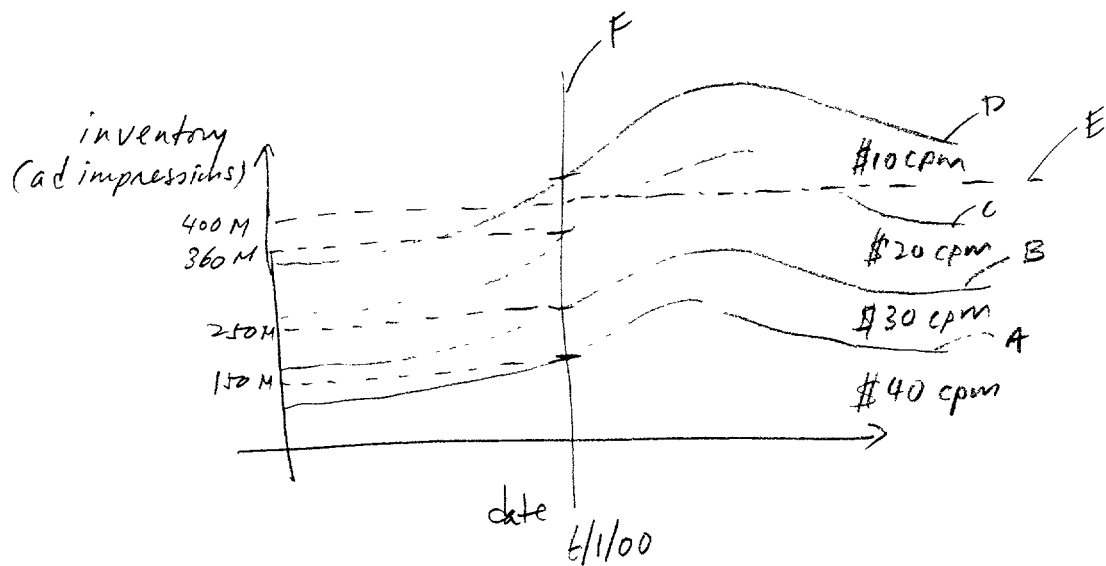
FIG. 6 is an illustrative diagram showing the demand curves calculated in accordance with one embodiment of the present invention.

The derivation of the selective booking limit(s) will now be described. FIG. 6 shows the demand curves for various categories of ad impressions. In FIG. 6, the y-axis represents the number of ad impressions and the x-axis represents the timeline expressed as dates. Each curve represents the demand for a specific category of ad impressions. One category of ad impressions may include ad impressions shown exclusively on a web page having a particular property (or special area of interest) which is frequented by a targeted audience, for example, a "finance" web page generally visited by individuals having income in excess of $100,000. Another category may include ad impressions shown on web pages within the website.

The demand curves are typically stacked one on top of another starting with the most expensive ad impressions at the bottom. Since the less expensive ad impressions tend to have a higher demand, they are usually restricted in order to maximize the sale of the more expensive ad impressions. It should be understood, however, that the demand curves do not necessarily have to appear in the foregoing manner. It is foreseeable that a higher priced category may have a higher demand than a lower price category.

As shown in FIG. 6, demand for the $40 cpm ad impressions is represented by curve A; demand for the $30 cpm ad impressions is represented by curve B; so on and so forth. Also shown in FIG. 6 is the curve E which represents the total inventory within a certain time period. For illustrative purposes, curve E is shown as a straight line but it is to be understood that the total inventory curve can assume other shapes and curvatures.

By drawing a vertical line, for example, line F, for a selected date, the appropriate booking limit(s) for various categories of ad impressions can be determined. The appropriate booking limit for a particular category of ad impressions on a selected date is determined as follows. For example, assume that a user desires to know the booking limit for category D ad impressions on Jun. 1, 2000. Using line F, it is first calculated that the collective demand for all other categories of ad impressions is 360M (150M for category A, 100M for category B and 110M for category C). This demand is then subtracted from the total inventory to determine how much of category D ad impressions can be sold. In the present case, 400M−360M=40M, or this can be expressed in terms of percentages, i.e., 40/400=10%. Therefore, only 10% of the total inventory can be sold as category D ad impressions. Hence, if 30M of category D ad impressions have been sold, then only 10M (40M−30M) of this same category of ad impressions are available for sale.

Similarly, the booking limit(s) for other categories of ad impressions on Jun. 1, 2000 can also be determined. For example, for category C ad impressions, the booking limit on Jun. 1, 2000 is 27.5% (110/400).

It should be understood that the booking limit(s) are provided to help prevent higher priced ad impressions from being displaced by lower priced ones. Depending on the particular application and/or situation, these booking limit(s) are to be applied accordingly. For example, while the booking limit for the most expensive category is calculated, such limit is not likely to be enforced. The rationale is straightforward. The most expensive category generates more revenue per ad impression. Therefore, from a revenue standpoint, it is always preferable to sell more ad impressions from such category.

In an exemplary embodiment, the demand curve for each category of ad impressions is derived as follows. First, each contract sold is examined to extract certain relevant information. More specifically, the relevant information includes ad impression start date, ad impression end date, contract execution date, profile information (i.e., whether the ad impressions are for a targeted audience), property information (i.e., whether the ad impressions are to be displayed on a web page of special interest), and the target number of ad impressions agreed to be delivered.

Using the ad impression start date and end date, the duration of the contract, in terms of the number of days, is calculated. For example, if the start date is Jan. 1, 2001 and the end date is Mar. 31, 2001, then the contract duration is calculated to be 90 days (31+28+31=90).

The contract is divided into a series of subcontracts based on the contract duration and ad category. The number of subcontracts is determined based on the contract duration, i.e., the number of days of the contract, and the cumulative total of the number of ad categories for ad impressions to be delivered for each day of the contract. Ad categories can be defined using any number of criteria, such as ad rate. An ad category is determined based on, for example, the profile and property information provided in the contract. For example, if the contract duration is 90 days and the contract calls for ad impressions belonging to only one ad category, then the contract is divided into 90 subcontracts. If, however, the contract calls for ad impressions belonging to two ad categories to be delivered each day over a contract duration of 90 days, then the contract is divided into 180 subcontracts.

Each subcontract contains various types of information including the date of delivery, the number of ad impressions to be delivered for that day, the number of days in advance the ad impressions to be delivered for that day was sold, and the ad category of the ad impressions to be delivered.

The number of ad impressions to be delivered for that day can be calculated in a number of ways. For example, assuming that the target number of ad impressions agreed to be delivered under the entire contract is to be spread out equally over the contract duration, the number of ad impressions to be delivered under each subcontract is calculated by dividing the target number of ad impressions by the contract duration. For example, if the target number of ad impressions is 90 million and the contract duration is 90 days, then the number of ad impressions to be delivered for each subcontract is 1 million. It should be noted that the contract may explicitly specify an ad impression delivery schedule to be followed during the contract duration. As a result, for a contract, the number of ad impressions to be delivered under each of the subcontracts may vary. In addition, the number of ad impressions to be delivered under each subcontract may be biased or adjusted depending on other factors or purposes.

The number of days in advance the ad impressions to be delivered for that day was sold is determined as follows. It is the number of days between the contract execution date and the date of delivery. In other words, it is the number of days in advance the ad impressions were sold before they are delivered.

The above process is repeated for all the relevant contracts. As a result, a number of subcontracts are created. These subcontracts are further processed to obtain the desired demand curves. More specifically, one demand curve is created for each ad category.

Figure 7:
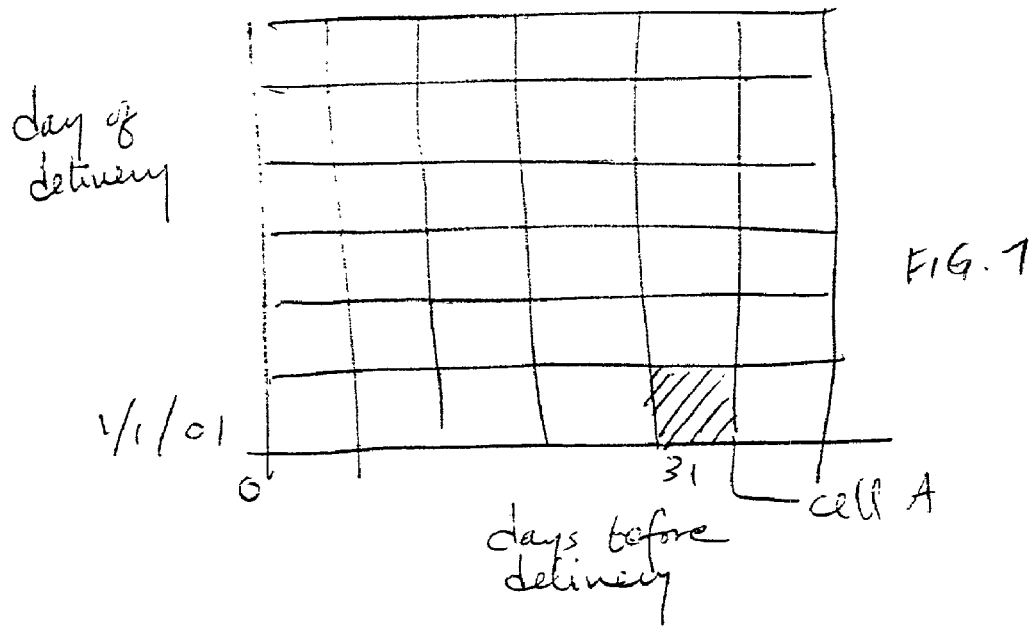

A demand curve for a particular ad category is created as follows. All the subcontracts which belong to the desired ad category are identified. A matrix is then constructed using information from each of the identified subcontracts. More specifically, as shown in FIG. 7, the matrix includes a number of cells. Each cell is defined by a row and a column. Each row represents a specific day of delivery and each column represents the number of days before delivery. The value of a cell represents the number of ad impressions to be delivered in the future starting from a particular day.

The value of a cell is obtained cumulatively from the identified subcontracts. As mentioned above, each subcontract contains information including the date of delivery, the number of ad impressions to be delivered for that day, and the number of days in advance the ad impressions to be delivered for that day was sold. Using the date of delivery and the number of days in advance the ad impressions to be delivered for that day was sold to locate a specific row and column, the number of ad impressions to be delivered for that day is added to the value of that cell. In addition, the number of ad impressions to be delivered for that day is also added to each cell to the left along the same row.

For example, assume a subcontract having a Jan. 1, 2001 delivery date, the number of ad impressions to be delivered on that date is 1 million, and the ad impressions were sold 31 days in advance. Then, cell A as shown in FIG. 7 is incremented by 1 million and all the cells to the left of cell A, i.e., from 0-30 days before delivery on Jan. 1, 2001, are also incremented by 1 million. Once all the identified subcontracts are processed, the value of a cell then represents the total number of ad impressions to be delivered on that day sold a certain number of days in advance.

Figure 8:
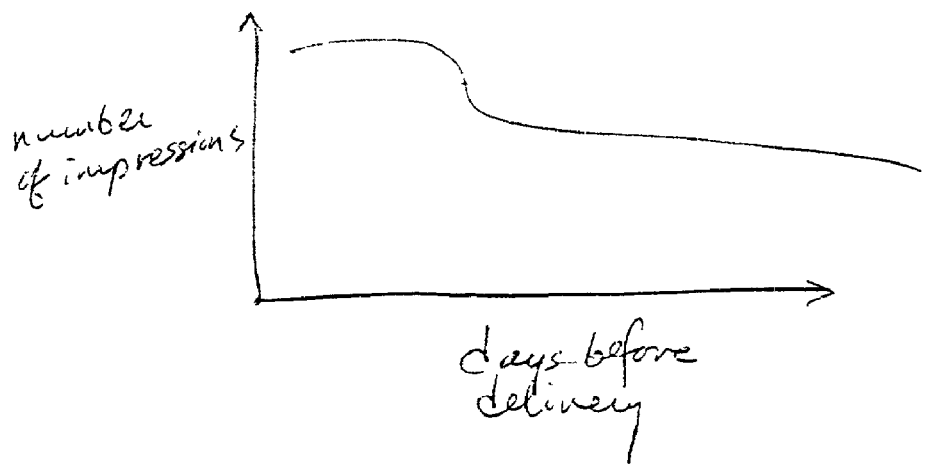

Using the matrix, a graph can be plotted for each row, i.e., each day of delivery. The y-axis of the graph represents the number of ad impressions and the x-axis represents the number of days before delivery. In other words, the value of each cell in a particular row is plotted against the number of days before delivery. An example of such a graph is shown in FIG. 8.

Also, using the matrix, the number of ad impressions that were sold on a particular day is known and the number of ad impressions that were sold in advance of a particular day is also known. Therefore, a 45° data line can be used to determine data which are available. For example, using the graph as shown in FIG. 9 and assuming the current day is Dec. 31, 2000, all the data below the data line B is available, while data above the data line is not yet available. The data line B assumes a 45° angle. This is because the number of ad impressions that were sold on a particular day is known. The data point at C is available. Data point C corresponds to a date of Jan. 31, 2001, which is 31 days in advance of Dec. 31, 2000 which, in turn, is the current date as assumed above.

The 45° data line can be used to extrapolate data points which are not available. FIG. 10 is used to provide an illustrative example. Assume the current date is Dec. 31, 2000. Data points X, Y and Z are available. The goal is to determine the approximate number of ad impressions sold on Jan. 20, 2001 with 0 days before delivery associated with data point W. Jan. 20, 2001 is 20 days in advance of the current date.

Assume past history provides a reasonably good estimation of future demand, data point W is determined as follows.

$$W/X = Y/Z$$

$$W = X(Y/Z)$$

$$W = (1/20/01\ 20\text{-days-before-delivery}) \times \frac{(1/20/00\ 0\text{-day-before-delivery})}{(1/20/00\ 20\text{-days-before-delivery})}$$

$$W\ 200M \times 300M/150M = 400M$$

Therefore, it is estimated that 400 million ad impressions will have been sold on Jan. 20, 2001.

Alternatively, the data points W, X, Y and Z can be graphically shown as in FIG. 11. The function f(T) represented by the curve T which includes data points Y and Z can be mathematically determined. Having determined the function represented by the curve T, a similar function f(T') represented by the curve T' can be extrapolated using data point X thereby allowing data point W to be determined.

Once the desired data points for the future are determined, a demand curve can be plotted similar to the ones shown in FIG. 6.

While the logic for implementing the selective booking limit(s) is described as part of the inventory management system, it should be understood that such logic can be made to reside outside of the inventory management system. Furthermore, in a preferred embodiment, the present invention is implemented using computer programming languages such as C, C++, etc. It should be understood that the present invention can also be implemented using hardware or software, or a combination thereof. A person skilled in the art will know of other ways, methods, and/or techniques to implement the present invention.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A computer system for managing allocation levels of advertising inventory, comprising:
   a computer;
   instructions executable by the computer to identify a plurality of categories of ad impressions; and
   instructions executable by the computer to implement a plurality of restrictions designed to limit said allocation levels of said advertising inventory;
   wherein one or more of said plurality of restrictions are applied to one or more of said categories of advertisements so as to limit the availability of said one or more of said categories of ad impressions;
   wherein said one or more of said plurality of restrictions applied to said one or more of said plurality of categories of ad impressions are adjusted in response to demand for said one or more of said plurality of categories of ad impressions, said demand for one of said plurality of categories of ad impressions being calculated using a method comprising:
   (a) generating with a computer a matrix having a plurality of rows and a plurality of columns, wherein a row and a column define a cell, each of said plurality of rows represents a specific day of delivery, each of said plurality of columns represents number of days before delivery, and value of a cell represents number of ad impressions to be delivered;
   (b) populating cells of said matrix with data;
   (c) plotting a graph having a y-axis and an x-axis, said y-axis representing day of delivery and said x-axis representing days before delivery, wherein data points on said graph correspond to said cells of said matrix;
   (d) identifying a data line from said graph based on a selected date; and
   (e) extrapolating a requested data point using said data line.

2. The system according to claim 1, wherein each one of said plurality of categories of ad impressions is designated a pricing level.

3. The system according to claim 1, wherein said plurality of restrictions are designed based on one or more demand analyses performed on said plurality of categories of ad impressions.

4. The system according to claim 1, wherein ad revenue generated by sale of said advertising inventory is optimized by limiting the availability of said one or more of said categories of ad impressions.

5. A computer system for managing allocation levels of advertising inventory, comprising:
   an ad request interface capable of issuing a request for a desired category of ad impressions within said advertising inventory; and
   an inventory management system designed to provide a response to said request issued by said ad request interface;
   wherein said response includes availability information on said desired category of ad impressions;
   wherein said availability information is obtained based on selectively restricting, based on respective demand for said desired category of ad impressions and other categories of ad impressions, the quantity of said desired category of ad impressions which are available for sale, said demand for said desired category of ad impressions being calculated using a method comprising:
   (a) generating with a computer a matrix having a plurality of rows and a plurality of columns, wherein a row and a column define a cell, each of said plurality of rows represents a specific day of delivery, each of said plurality of columns represents number of days before delivery, and value of a cell represents number of ad impressions to be delivered;
   (b) populating cells of said matrix with data;
   (c) plotting a graph having a y-axis and a x-axis, said y-axis representing day of delivery and said x-axis representing days before delivery, wherein data points on said graph correspond to said cells of said matrix;
   (d) identifying a data line from said graph based on a selected date;
   (e) extrapolating a requested data point using said data line.

6. The system according to claim 5, wherein said request includes date and demographic information.

7. The system according to claim 5, wherein ad revenue generated from sale of said advertising inventory is optimized by selectively restricting the quantity of said desired category of ad impressions which are available for sale.

8. The system according to claim 5, wherein said selective restriction is adjusted in response to respective subsequent demand for said desired category of ad impressions and other categories of ad impressions.

9. The system according to claim 5, wherein said advertising inventory has a plurality of categories of ad impressions:
wherein said plurality of categories of ad impressions have their respective pricing levels;
wherein said desired category of ad impressions has the lowest pricing level amongst said respective pricing levels.

10. A computer system for managing advertising inventory to optimize ad revenue, comprising:
an ad request interface capable of issuing a request for a desired category of ad impressions within said advertising inventory;
an inventory management system configured to interact with said ad request interface by forwarding a response to said ad request interface pursuant to said request; and
an availability allocation module designed to provide said response to said inventory management system;
wherein said response is prepared based on one or more selective restrictions designed to limit the quantity of said desired category of ad impressions which are available for sale;
wherein said inventory management system calculates an amount of available inventory for said desired category of ad impressions;
wherein said availability allocation module adjusts said amount of available inventory based on said one or more selective restrictions and prepares said response using said adjusted amount of available inventory; and
wherein said amount of available inventory is adjusted based on demand for other categories of ad impressions, said demand for one of said other categories of ad impressions being calculated using a method comprising:
(a) generating with a computer a matrix having a plurality of rows and a plurality of columns, wherein a row and a column define a cell, each of said plurality of rows represents a specific day of delivery, each of said plurality of columns represents number of days before delivery, and value of a cell represents number of ad impressions to be delivered;
(b) populating cells of said matrix with data;
(c) plotting a graph having a y-axis and a x-axis, said y-axis representing day of delivery and said x-axis representing days before delivery, wherein data points on said graph correspond to said cells of said matrix;
(d) identifying a data line from said graph based on a selected date; and
(e) extrapolating a requested data point using said data line.

11. The system according to claim 10, wherein said request includes date and demographic information.

12. The system according to claim 10, wherein said desired category of ad impressions has a pricing level;
wherein said other categories of ad impressions have their respective pricing levels; and
wherein said pricing level of said desired category of ad impressions is lowest amongst said respective pricing levels of said other categories of ad impressions.

13. A method for managing allocation levels of advertising inventory, comprising steps of:
classifying said advertising inventory into a plurality of categories of ad impressions; and
imposing with a computer at least one restriction on at least one of said plurality of categories of ad impressions to limit the amount of said at least one of said plurality of categories of ad impressions which is available for sale;
wherein said at least one restriction imposed on said at least one of said plurality of categories of ad impressions is adjusted in response to demand for said at least one of said plurality of categories of ad impressions, said demand for said at least one of said plurality of categories of ad impressions being calculated using a method comprising;
(a) generating with a computer a matrix having a plurality of rows and a plurality of columns, wherein a row and a column define a cell, each of said plurality of rows represents a specific day of delivery, each of said plurality of columns represents number of days before delivery, and value of a cell represents number of ad impressions to be delivered;
(b) populating cells of said matrix with data;
(c) plotting a graph having a y-axis and an x-axis, said y-axis representing day of delivery, and said x-axis representing days before delivery, wherein data points on said graph correspond to said cells of said matrix;
(d) identifying a data line from said graph based on a selected date; and
(e) extrapolating a requested data point using said data line.

14. The method according to claim 13, further comprising a step of:
adjusting said at least one restriction in response to demand for others of said plurality of categories of ad impressions.

15. The method according to claim 13, wherein said at least one restriction is imposed based on respective demand for said plurality of categories of ad impressions.

16. The method according to claim 13, wherein said plurality of categories of ad impressions have their respective pricing levels; and
wherein said at least one of said plurality of categories of ad impressions has a pricing level amongst the lowest of said respective pricing levels of said plurality of categories of ad impressions.

17. The method according to claim 13, wherein ad revenue generated by sale of said advertising inventory is optimized by said imposition of said at least one restriction.

18. A method for managing advertising inventory to enhance ad revenue, comprising steps of:
receiving at a computer an availability request for a desired category of ad impressions within said advertising inventory;
determining a quantity of said desired category of ad impressions which are available for sale;
adjusting with the computer said quantity based on one or more restrictions imposed on said desired category of ad impressions;
providing a response to said availability request using said adjusted quantity;
adjusting said one or more restrictions in response to demand for other categories of ad impressions within said advertising inventory, said demand for one of said other categories of ad impressions being calculated using a method comprising:
(a) generating with a computer a matrix having a plurality of rows and a plurality of columns, wherein a row and a column define a cell, each of said plurality of rows represents a specific day of delivery, each of said plurality of columns represents number of days before delivery, and value of a cell represents number of ad impressions to be delivered;

(b) populating cells of said matrix with data;

(c) plotting a graph having a y-axis and an x-axis, said y-axis representing day of delivery, and said x-axis representing days before delivery, wherein data points on said graph correspond to said cells of said matrix;

(d) identifying a data line from said graph based on a selected date; and (e) extrapolating a requested data point using said data line.

* * * * *